United States Patent
Nordin et al.

(10) Patent No.: US 7,109,424 B2
(45) Date of Patent: Sep. 19, 2006

(54) ALIEN CROSSTALK SUPPRESSION WITH ENHANCED PATCH CORD

(75) Inventors: Ronald A Nordin, Naperville, IL (US); David R Hawkins, Sugar Hill, GA (US); Michael V. Doorhy, Mokena, IL (US); Jack D. Tison, Bourbonnais, IL (US); Andrew J. Stroede, Frankfort, IL (US); Masud Bolouri-Saransar, Orland Park, IL (US); Scott R. Hartman, Oak Forest, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/887,718

(22) Filed: Jul. 9, 2004

(65) Prior Publication Data

US 2005/0029007 A1 Feb. 10, 2005

Related U.S. Application Data

(60) Provisional application No. 60/565,464, filed on Apr. 26, 2004, provisional application No. 60/488,566, filed on Jul. 18, 2003, provisional application No. 60/486,683, filed on Jul. 11, 2003.

(51) Int. Cl.
*H01B 11/02* (2006.01)
(52) U.S. Cl. .............................. 174/113 R; 174/117 F; 174/117 FF; 174/117 R; 174/27
(58) Field of Classification Search ............... 174/113, 174/117 FF, 117 F, 117 R, 27
See application file for complete search history.

(56) References Cited

U.S. PATENT DOCUMENTS

| 483,285 A | 9/1892 | Guilleaume |
|---|---|---|
| 1,883,269 A | 10/1932 | Yonkers |
| 1,976,847 A | 10/1934 | Gordon et al. |
| 2,125,869 A | 8/1938 | Atkinson |
| 2,455,773 A | 12/1948 | Johnson |
| 2,538,019 A | 1/1951 | Lee |
| 2,583,026 A | 1/1952 | Swift |
| RE24,154 E | 5/1956 | Krueger |
| 2,804,494 A | 8/1957 | Fenton |
| 2,847,499 A | 8/1958 | Peterson |
| 3,005,739 A | 10/1961 | Lang et al. |
| 3,086,557 A | 4/1963 | Peterson |
| 3,102,160 A | 8/1963 | Cook et al. |
| 3,131,469 A | 5/1964 | Glaze |
| 3,234,722 A | 2/1966 | Gilmore |

(Continued)

FOREIGN PATENT DOCUMENTS

DE 697378 10/1940

(Continued)

OTHER PUBLICATIONS

Patch Cord Information Sheet, Produced by Anixter International, Jul. 22, 2002, ANIXER.*

(Continued)

*Primary Examiner*—Jinhee Lee
(74) *Attorney, Agent, or Firm*—Robert A. McCann; Zachary J. Smolinski (57) ABSTRACT

Systems and methods for decreasing alien crosstalk use enhanced patch cords for introducing additional attenuation. The enhanced patch cords are preferably shielded to reduce alien crosstalk down their lengths and also attenuate signals passing therethrough to a greater extent than standard communication patch cords. The interaction of two enhanced patch cords results in two suppression steps for alien crosstalk and only one suppression step for intended signal passing through a communication cable.

6 Claims, 6 Drawing Sheets

U.S. PATENT DOCUMENTS

| | | |
|---|---|---|
| 3,622,683 A | 11/1971 | Roberts et al. |
| 3,649,434 A | 3/1972 | Mortenson |
| 3,649,744 A | 3/1972 | Coleman |
| 3,650,862 A | 3/1972 | Burr |
| 3,715,458 A | 2/1973 | Bayes et al. |
| 3,761,842 A | 9/1973 | Gandrud |
| 3,803,340 A | 4/1974 | Jachimowicz et al. |
| 3,881,052 A | 4/1975 | Britz et al. |
| 3,911,200 A | 10/1975 | Simons et al. |
| 3,921,381 A | 11/1975 | Vogelsberg |
| 4,010,213 A | 3/1977 | Naegeli |
| 4,034,148 A | 7/1977 | Lang |
| 4,041,237 A | 8/1977 | Stine et al. |
| 4,081,602 A | 3/1978 | Paniri et al. |
| 4,085,284 A | 4/1978 | Olszewski et al. |
| 4,131,690 A | 12/1978 | Jukes et al. |
| 4,165,442 A | 8/1979 | Gabriel et al. |
| 4,218,581 A | 8/1980 | Suzuki |
| 4,234,759 A | 11/1980 | Harlow |
| 4,319,940 A | 3/1982 | Arroyo et al. |
| 4,340,771 A | 7/1982 | Watts |
| 4,356,345 A | 10/1982 | Gonia |
| 4,368,214 A | 1/1983 | Gillette |
| 4,393,582 A | 7/1983 | Arnold, Jr. et al. |
| 4,394,705 A | 7/1983 | Blachman |
| 4,412,094 A | 10/1983 | Dougherty et al. |
| 4,449,012 A | 5/1984 | Voser |
| 4,453,031 A | 6/1984 | Justiss |
| 4,467,138 A | 8/1984 | Brorein |
| 4,468,089 A | 8/1984 | Brorein |
| 4,481,379 A | 11/1984 | Bolick, Jr. et al. |
| 4,486,619 A | 12/1984 | Trine et al. |
| 4,487,992 A | 12/1984 | Tomita |
| 4,500,748 A | 2/1985 | Klein |
| 4,515,993 A | 5/1985 | MacKenzie |
| 4,541,980 A | 9/1985 | Kiersarsky et al. |
| 4,550,559 A | 11/1985 | Thomson |
| 4,588,852 A | 5/1986 | Fetterolf et al. |
| 4,595,793 A | 6/1986 | Arroyo et al. |
| 4,605,818 A | 8/1986 | Arroyo et al. |
| 4,697,051 A | 9/1987 | Beggs et al. |
| 4,711,811 A | 12/1987 | Randa |
| 4,755,629 A | 7/1988 | Beggs et al. |
| 4,767,890 A | 8/1988 | Magnan |
| 4,777,325 A | 10/1988 | Siwinski |
| 4,800,236 A | 1/1989 | Lemke |
| 4,873,393 A | 10/1989 | Friesen et al. |
| 4,933,513 A | 6/1990 | Lee |
| 4,941,729 A | 7/1990 | Hardin et al. |
| 4,963,609 A | 10/1990 | Anderson et al. |
| 5,010,210 A | 4/1991 | Sidi et al. |
| 5,015,800 A | 5/1991 | Vaupotic et al. |
| 5,103,067 A | 4/1992 | Aldissi |
| 5,132,488 A | 7/1992 | Tessier et al. |
| 5,142,100 A | 8/1992 | Vaupotic |
| 5,162,609 A | 11/1992 | Adriaenssens et al. |
| 5,202,946 A | 4/1993 | Hardin et al. |
| 5,205,762 A * | 4/1993 | Carney ............... 439/607 |
| 5,245,134 A | 9/1993 | Vana, Jr. et al. |
| 5,253,317 A | 10/1993 | Allen et al. |
| 5,283,390 A | 2/1994 | Hubis et al. |
| 5,286,923 A | 2/1994 | Prudhon et al. |
| 5,298,680 A | 3/1994 | Kenny |
| 5,342,991 A | 8/1994 | Xu et al. |
| 5,367,971 A | 11/1994 | Carpenter et al. |
| 5,376,758 A | 12/1994 | Kimber |
| 5,393,933 A | 2/1995 | Goertz |
| 5,399,813 A | 3/1995 | McNeill et al. |
| 5,401,908 A | 3/1995 | Rodeghero |
| 5,424,491 A | 6/1995 | Walling et al. |
| 5,434,354 A | 7/1995 | Baker et al. |
| 5,448,669 A | 9/1995 | Dunn et al. |
| 5,493,071 A | 2/1996 | Newmoyer |
| 5,514,837 A | 5/1996 | Kenny et al. |
| 5,525,757 A | 6/1996 | O'Brien |
| 5,541,361 A | 7/1996 | Friesen et al. |
| 5,544,270 A | 8/1996 | Clark et al. |
| 5,574,250 A | 11/1996 | Hardie et al. |
| 5,606,151 A | 2/1997 | Siekierka et al. |
| 5,734,126 A | 3/1998 | Siekierka et al. |
| 5,742,002 A | 4/1998 | Arredondo et al. |
| 5,744,757 A | 4/1998 | Kenny et al. |
| 5,767,441 A | 6/1998 | Brorein et al. |
| 5,770,820 A | 6/1998 | Nelson et al. |
| 5,789,711 A | 8/1998 | Gaeris et al. |
| 5,834,697 A | 11/1998 | Baker et al. |
| 5,900,588 A | 5/1999 | Springer et al. |
| 5,932,847 A | 8/1999 | Mayfield |
| 5,936,205 A | 8/1999 | Newmoyer |
| 5,944,535 A * | 8/1999 | Bullivant et al. ............... 439/49 |
| 5,952,607 A | 9/1999 | Friesen et al. |
| 5,952,615 A | 9/1999 | Prudhon |
| 5,956,445 A | 9/1999 | Deitz, Sr. et al. |
| 5,969,295 A | 10/1999 | Boucino et al. |
| 5,990,419 A | 11/1999 | Bogese, II |
| 6,037,546 A | 3/2000 | Mottine et al. |
| 6,066,799 A | 5/2000 | Nugent |
| 6,101,305 A | 8/2000 | Wagman et al. |
| 6,153,826 A * | 11/2000 | Kenny et al. ................. 174/27 |
| 6,194,663 B1 | 2/2001 | Friesen et al. |
| 6,211,467 B1 | 4/2001 | Berelsman et al. |
| 6,222,129 B1 | 4/2001 | Siekierka et al. |
| 6,248,954 B1 | 6/2001 | Clark et al. |
| 6,255,593 B1 | 7/2001 | Reede |
| 6,288,340 B1 | 9/2001 | Arnould |
| 6,323,427 B1 | 11/2001 | Rutledge |
| 6,353,177 B1 | 3/2002 | Young |
| 6,433,272 B1 | 8/2002 | Buhler et al. |
| 6,452,105 B1 | 9/2002 | Badii et al. |
| 6,465,737 B1 | 10/2002 | Bonato et al. |
| 6,476,326 B1 | 11/2002 | Fuzier et al. |
| 6,506,976 B1 | 1/2003 | Neveux, Jr. |
| 6,534,715 B1 | 3/2003 | Maunder et al. |
| 6,545,222 B1 | 4/2003 | Yokokawa et al. |
| 6,566,605 B1 | 5/2003 | Prudhon |
| 6,566,607 B1 | 5/2003 | Walling |
| 6,570,095 B1 | 5/2003 | Clark et al. |
| 6,573,456 B1 | 6/2003 | Spruell et al. |
| 6,618,774 B1 * | 9/2003 | Dickens et al. ............... 710/64 |
| 6,624,359 B1 | 9/2003 | Bahlmann et al. |
| 6,639,152 B1 | 10/2003 | Glew et al. |
| 6,743,983 B1 | 6/2004 | Wiekhorst et al. |
| 6,770,819 B1 | 8/2004 | Patel |
| 6,812,408 B1 | 11/2004 | Clark et al. |
| 2002/0079126 A1 | 6/2002 | Valenzuela |
| 2003/0106704 A1 | 6/2003 | Isley et al. |
| 2003/0121695 A1 | 7/2003 | Wiebelhaus et al. |
| 2003/0217863 A1 | 11/2003 | Clark et al. |
| 2004/0035603 A1 | 2/2004 | Clark et al. |
| 2004/0055777 A1 | 3/2004 | Wiekhorst et al. |
| 2004/0055779 A1 | 3/2004 | Wiekhorst et al. |
| 2004/0118593 A1 | 6/2004 | Augustine et al. |

FOREIGN PATENT DOCUMENTS

| | | |
|---|---|---|
| EP | 0 302 162 | 2/1989 |
| FR | 694100 | 11/1930 |
| GB | 1 390 152 | 4/1975 |
| JP | 6-349344 | 12/1994 |

OTHER PUBLICATIONS

Testing Local Area Network Cabling for High Speed Communications, H. Koeman.

Premises Wiring Gets the Standard Treatment, Nov. 1992.

Commercial Building Telecommunications Cabling Standard, TIA/EIA-568-A, Oct. 6, 1995.

* cited by examiner

ALIEN CROSSTALK SUPPRESSION WITH ENHANCED PATCH CORD

CROSS-REFERENCE TO RELATED APPLICATIONS

This application claims the benefit of U.S. Provisional Patent Application Ser. No. 60/486,683, entitled "Alien Crosstalk Suppression with Enhanced Patch Cord Design," having Ronald A. Nordin as inventor and filed on Jul. 11, 2003; U.S. Provisional Patent Application Ser. No. 60/488,566, entitled "Alien Crosstalk Suppression With Enhanced Patch Cord," having Ronald A. Nordin as inventor and filed on Jul. 18, 2003; and U.S. Provisional Patent Application Ser. No. 60/565,464, entitled "Alien Crosstalk Suppression with Enhanced Patch Cord," having Ronald A. Nordin as inventor and filed on Apr. 26, 2004. These provisional applications are further incorporated herein in their entireties.

FIELD OF THE INVENTION

The present invention relates generally to communications systems and more specifically relates to systems and methods for suppressing alien crosstalk in communications.

BACKGROUND OF THE INVENTION

Suppression of crosstalk in communication systems is an increasingly important practice for improving systems' reliability and the quality of communication. As the bandwidth of a communication systems increases, so does the importance of reducing or eliminating signal crosstalk.

In wired communication systems, crosstalk is caused by electromagnetic interference within a communication cable or between multiple cables. Crosstalk resulting from interaction between cables is known as alien crosstalk.

While crosstalk resulting from signals running within a single cable interfering with signals within the same cable can be managed using electronic crosstalk reduction methods, alien crosstalk poses additional problems because the qualities of the interfering or disturbing signal(s) are not known. Alien crosstalk has proven problematic in implementations such as 10 Gbps Ethernet communication over an installed base of Cat 6 or Cat 5e cable. In such cables, alien crosstalk can significantly hamper communication performance. Specially-designed cabling could be used to decrease alien crosstalk, but replacing existing cabling with newly-designed cabling entails significant expense.

Thus, there exists a need for alien crosstalk suppression methods and systems that may be used with installed cable.

SUMMARY OF THE INVENTION

According to one embodiment of the present invention, an improved patch cord having increased attenuation improves performance of an installed cabling system.

According to another embodiment of the present invention, alien crosstalk between communication cables is decreased by a method of using attenuating patch cables connected to the communication cables.

According to another embodiment of the present invention, cabling systems employ an improved patch cord to decrease alien crosstalk between communication cables.

DETAILED DESCRIPTION OF THE ILLUSTRATED EMBODIMENTS

Figure 1:
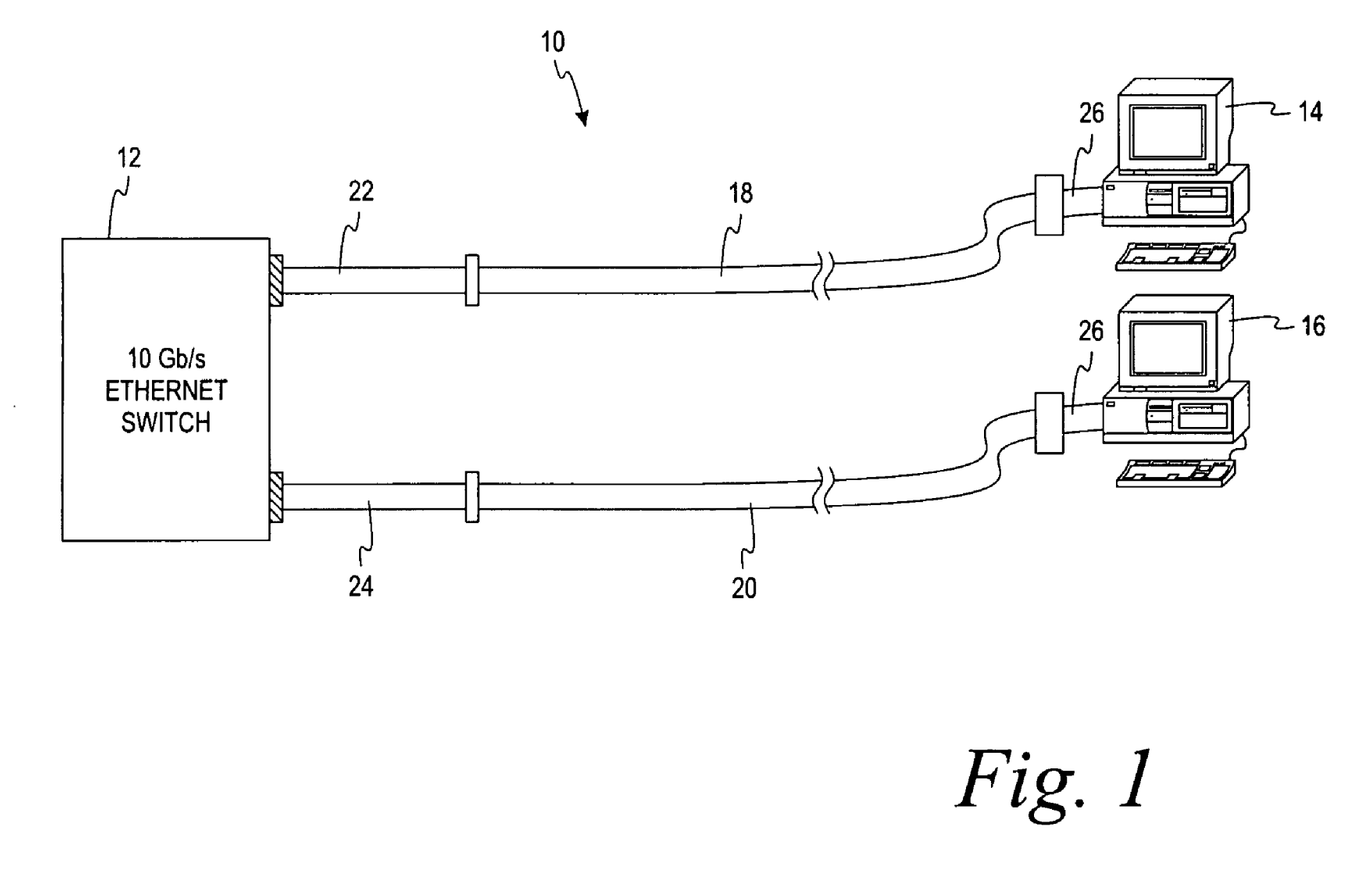
FIG. 1 is a plan view of a communication system according to one embodiment of the present invention.

Turning now to FIG. 1, a communication system 10 is shown. In the communication system 10, a network device such as the 10 Gb/s Ethernet switch 12 is connected to a plurality of devices, such as personal computers ("PCs") 14 and 16 by first and second communication cables 18 and 20, respectively. It is to be understood that while FIG. 1 shows the communication cables 18 and 20 extending from a single network device to two devices, systems and methods according to the present invention will allow for the suppression of alien crosstalk between communication cables regardless of the types of devices to which the cables are connected.

Generally, alien crosstalk resulting from the interaction between the communication cables 18 and 20 will be coupled along the entire lengths of the cables 18 and 20. The cables 18 and 20 act to suppress signal travelling through them to some degree, such that alien crosstalk occurring between the cables closer to the Ethernet switch 12 will be attenuated somewhat at the PCs 14 and 16.

Crosstalk suppression is enhanced in the system of FIG. 1 by the use of first and second enhanced patch cords 22 and 24. The enhanced patch cords 22 and 24 are designed to suppress crosstalk along their lengths, for example by providing additional shielding. In addition, the enhanced patch cords 22 and 24 attenuate communications signals and noise, such as crosstalk, travelling through them. Attenuation in the patch cords 22 and 24 may be accomplished in a number of ways. For example, attenuation may be increased by the use of finer-gauge wire within the enhanced patch cords 22 and 24 or by increasing the number of twists per inch in wires contained within the patch cords 22 and 24.

The strength of alien crosstalk is dependent upon the strength of the interfering or disturbing signal. Thus, increased attenuation provided by the first enhanced patch cord 22 will reduce the signal level in the first communication cable 18. As a result, the alien crosstalk coupled into the second communication cable 20 from the first communication cable will be reduced due to attenuation by the first enhanced patch cord 22. Because the alien crosstalk caused by the first communication cable 18 in the second communication cable 20 will travel in both directions in the second communication cable 20, the alien crosstalk will also be subjected to suppression in the second enhanced patch cord 24.

For example, if a signal leaves the Ethernet switch 12 having a signal strength of 1 volt peak-to-peak, and the first enhanced patch cord 22 attenuates to 10% of the initial strength, the signal going from the Ethernet switch 12 to the first PC 14 will have a signal strength of 0.1 volt peak-to-peak. If 10% of that signal couples as alien crosstalk to the second communication cable 20, the alien crosstalk in the second cable will have a signal strength of 0.01 volt peak-to-peak. If the second enhanced patch cord 24 also has attenuating properties that reduce signals to 10% of the initial strength, the alien crosstalk will be suppressed in the second communication cable 20 to 0.001 volt peak-to-peak. Thus, the alien crosstalk has been subjected to the effects of two enhanced patch cords 22 and 24, and the signal from the Ethernet switch 12 through the second communication cable 20 has been subjected only to the effects of the second enhanced patch cord 24. Optional enhanced patch cords 26 have been shown for connection to the PCs 14 and 16 and similarly operate to reduce alien crosstalk at the user side of the communication connection.

Figure 2:
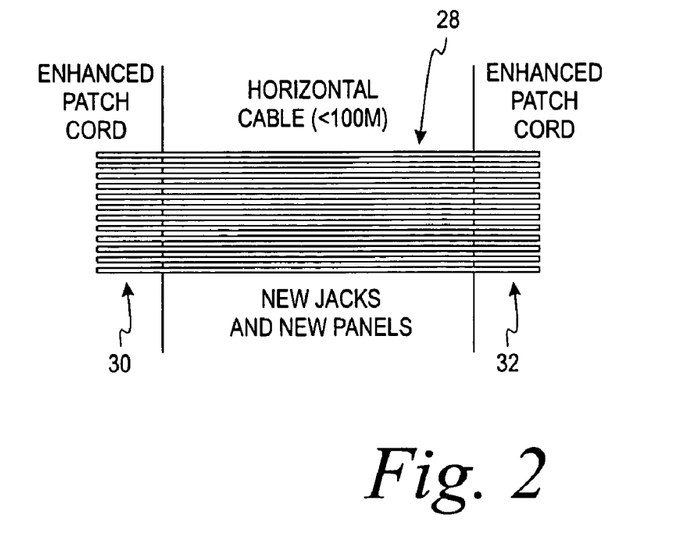
FIG. 2 is a schematic view of a cabling installation with improved patch cords for providing alien crosstalk suppression.

Enhanced patch cords according to the present invention may be integrated into a number of connections, as shown by FIG. 2, in which a horizontal cable plant 28 having multiple cables is enhanced by enhanced patch cords 30 and 32 provided at first and second ends of the communication path.

Figure 3:
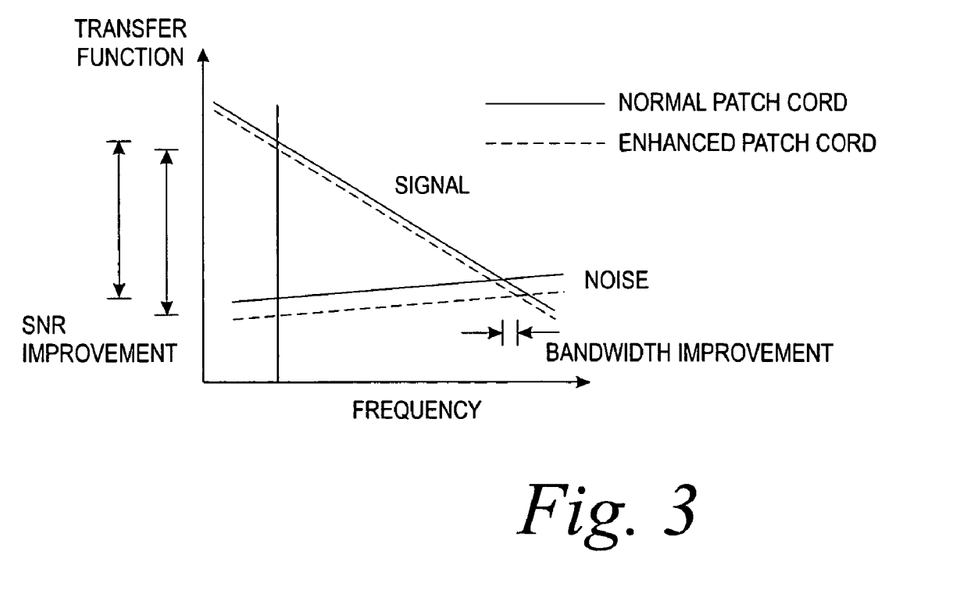
FIG. 3 is a graph showing the increased signal-to-noise ratio in a communication system using an enhanced patch cord according to the present invention.

The enhancement of signal-to-noise ratio using enhanced patch cords according to the present invention is shown in FIG. 3. The dotted line shows the reduced signal and noise resulting from the enhanced patch cords across the communication frequencies. Because the noise due to alien crosstalk is attenuated to a greater degree than the signal, both the available bandwidth and the signal-to-noise ratio are improved in systems employing enhanced patch cords according to the present invention.

Attenuation may be introduced into patch cords and other communication cabling using a variety of methods. There are two design parameters to consider in the design of a lossy patch cord. One parameter is the amount of insertion loss to include in the cable, and the second is the amount of alien crosstalk suppression or susceptibility to have in the cable. Both parameters are preferably addressed in a cable design.

Figure 4:
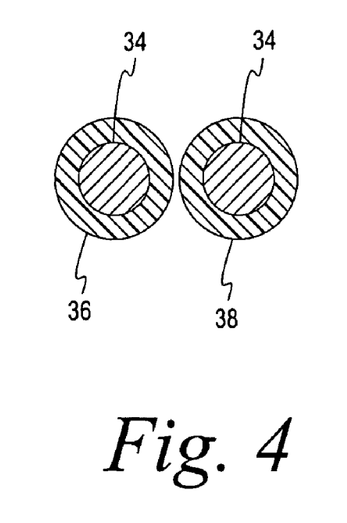
FIG. 4 is a cross-sectional view showing a conductor and lossy conductor insulation according to one embodiment of the present invention.

Dielectric loss may be increased as shown in FIG. 4 by providing a conductor 34 within lossy conductor insulation 36 or 38. Dielectric loss can also be increased by using such methods as: (a) cable jacket dielectric lossy material; (b) cable spline dielectric lossy material; and (c) a wire pair shield (which concentrates the E&M field through the wire insulation).

The use of a less conductive wire (for example, aluminum wire instead of copper wire) will also increase conductor loss. As mentioned above, conductor loss can also be increased by decreasing the conductor wire diameter or increasing the twist per unit length. Increasing the amount of twisting increases the effective length of the cord and hence increases the conductor loss.

Figure 5:
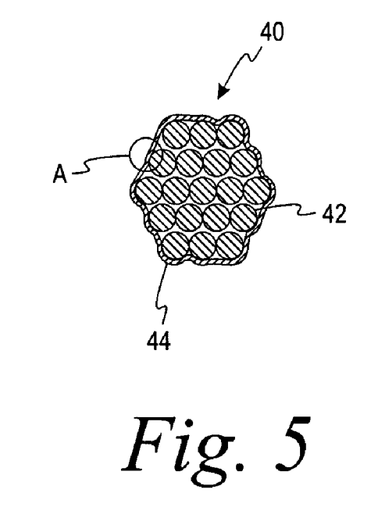
FIG. 5 is a cross-sectional view of stranded wires having a lossy conductive coating.
Figure 6:
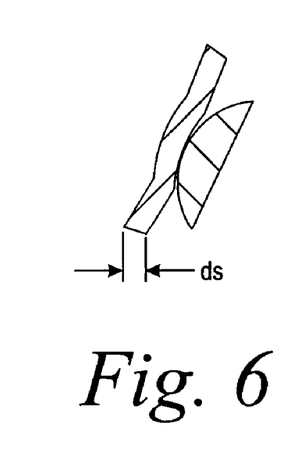
FIG. 6 is a detail view of the detail "A" of FIG. 5.

Conductor loss can also be increased by "tinning" a metal wire. A less-conductive coating on the circumference of the wire will increase the conductor loss because the current density congregates near the surface (via the skin effect) and will experience a higher loss through the tinned material. The use of stranded wire can also increase conductor loss, with an increase of loss by roughly 20% for comparable wire gauges. FIG. 5 shows a cross-sectional view of a cable 40 employing tinning and stranded wire. In the embodiment of FIG. 5, stranded copper conductors 42 are provided within a tin skin 44. FIG. 6 is a detail view of the detail "A" of FIG. 5. The skin is provided at a depth $d_s$.

The use of wire with a roughened surface can also increase the conductor loss through the wire.

Figure 7A:
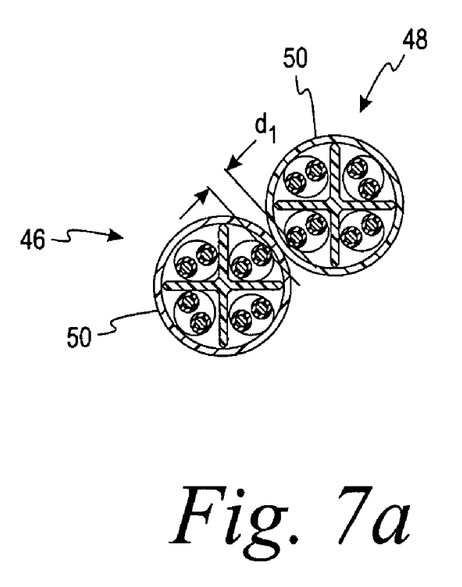
FIGS. 7a and 7b are cross-sectional views showing the comparison of two cable pairs, with the cable pair of FIG. 7b having increased distance between crosstalk pairs.
Figure 7B:
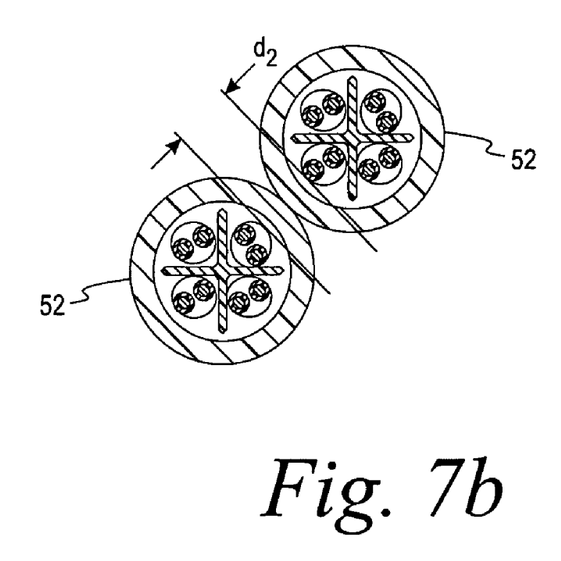

FIGS. 7a and 7b illustrate a technique to decrease the susceptibility of a cable by increasing the physical distance between crosstalk pairs. First and second cables 46 and 48 are placed in an abutting relationship. When the cable jacket material 50 is increased in thickness—for example, to jacket 52, as shown in FIG. 7b—the distance between crosstalk pairs is increased from $d_1$ shown in FIG. 7a to $d_2$ shown in FIG. 7b. According to one embodiment, the cable jacket material 50 is a foamed jacket material. Cable separators may also be used to increase separation between neighboring cables.

Figure 8:
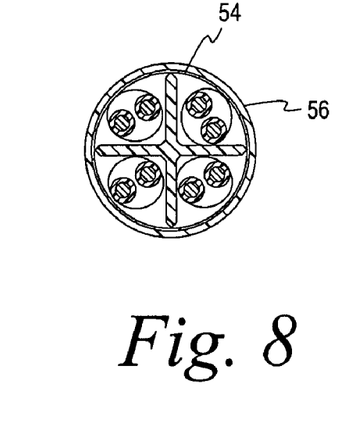
FIG. 8 is a cross-sectional view of a cable having a surrounding shield.
Figure 9:
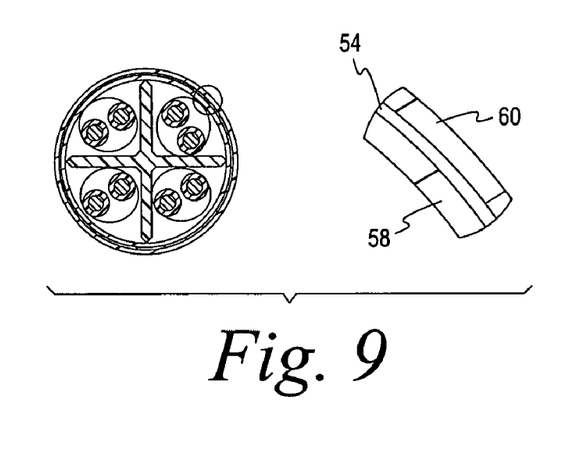
FIG. 9 is a cross-sectional view of a cable having a modified surrounding shield.

Metallic shielding can also be used to reduce susceptibility of alien signals into a signal cable pair. FIG. 8 is a cross-sectional view showing a technique to decrease the susceptibility of a cable by the incorporation of a conductive shield. In FIG. 8, conductive pairs 52 are provided within an overall conductive shield 54. The conductive shield 54, in turn, is provided within a jacket 56. As shown in FIG. 9 (which incorporates a detail view), in another embodiment a layer of overall shielding 54 may be provided between first and second layers 58 and 60 of jacketing material.

Figure 10:
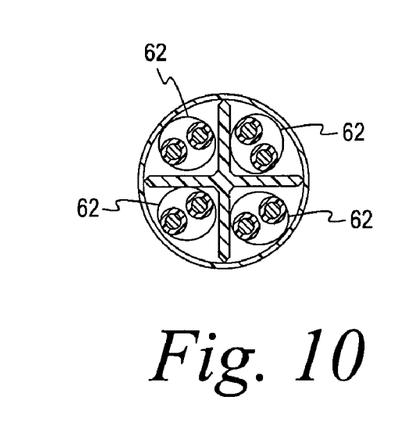
FIG. 10 is a cross-sectional view of a cable having shielding surrounding each wire pair.

FIG. 10 shows another embodiment, in which individual shielding 62 surrounds each wire pair.

Figure 11:
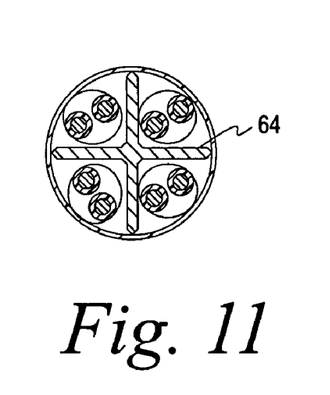
FIG. 11 is a cross-sectional view of a cable having a conductive spline.

Another embodiment is shown in FIG. 11, which illustrates the use of a conductive spline 64 or conductive pair separator used to decrease susceptibility.

In another embodiment, crosstalk may be reduced by modifying the lay of a cable along its length. The lay of a cable refers to the twisting of a cable along its length. In this embodiment, fixed twisted pair lengths are provided along the length of a cable. Four or more cable lay values providing a four-pair cable with twisted pair lengths over the length of the cable meeting the proposed 10 Gb/s Ethernet Near-End Crosstalk (NEXT) requirement are selected. Any four or more cable lay values are chosen at random, with the selection process being described as follows:

1. Cable lays (A, B, C, D, . . . ) are selected, with each of the lays meeting the 10 Gb/s Ethernet NEXT requirement.

2. Any of the four cable lays are selected without replacement during the cable lay process.

3. The selected cable lay is provided over a uniform or random length of cable less than or equal to ten meters.

4. Any of the three or more remaining cable lays are selected and applied to the cable construction as described in step 3.

5. The process is repeated until all cable lays have been assigned.

Figure 12:
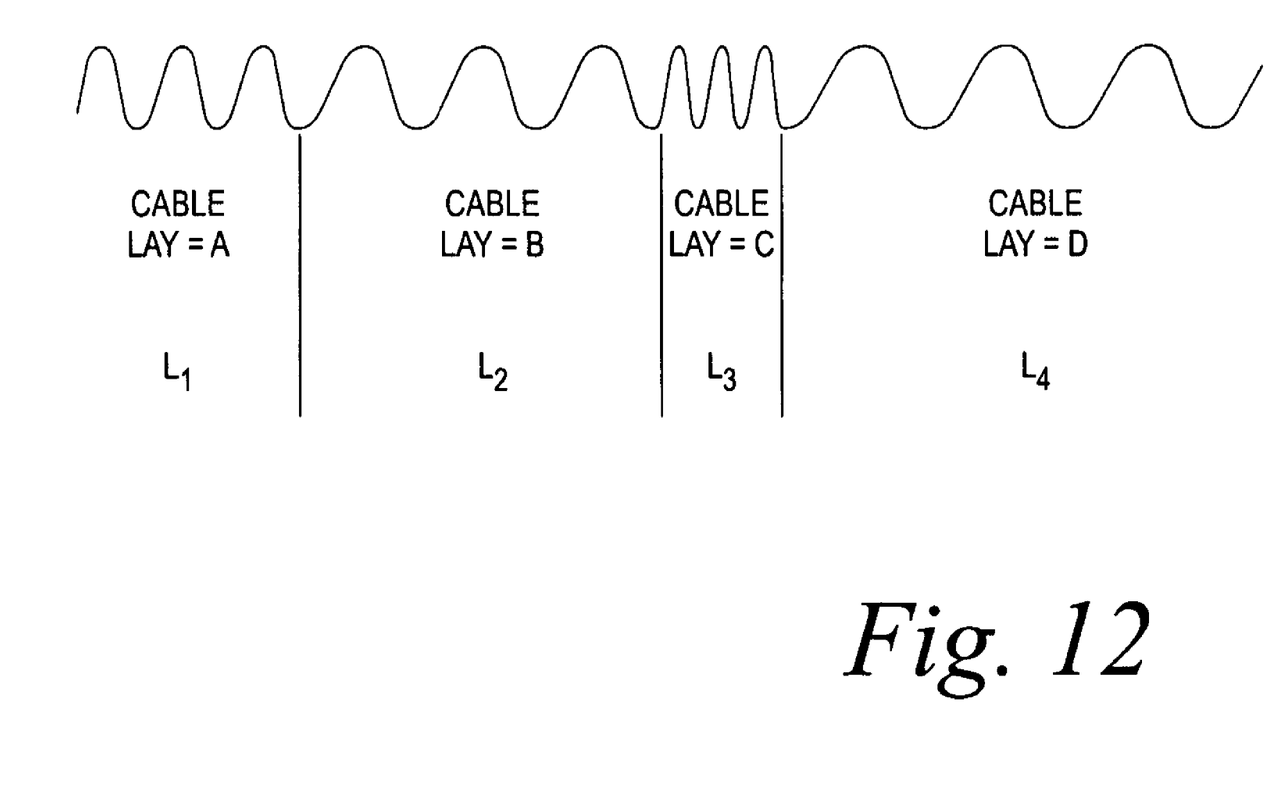
FIG. 12 is a diagram illustrating varying cable lays along the length of a cable.

A diagram of a cable length employing random distances between cable lay transitions and using four different cable lays is shown in FIG. 12.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system for reducing alien crosstalk in a communication network comprising:
    a first communication cable connected via a first enhanced patch cord to a first network device, said first enhanced patch cord being a first attenuating patch cord having a first patch cord attenuation greater than an attenuation of said first communication cable; and
    a second communication cable connected via a second enhanced patch cord to a second network device, said second enhanced patch cord being a second attenuating patch cord having a second patch cord attenuation greater than an attenuation of said second communication cable,
    wherein said first patch cord comprises a plurality of twisted communication wires and said first communication cable also comprises a plurality of twisted communication wires, said twisted communication wires of said first patch cord having more twists per length than said twisted communication wires of said first communication cable, and
    wherein the attenuation of the first patch cord is greater due to the first patch cord having more twists per length than said first communication cable.

2. A system for reducing alien crosstalk in a communication network comprising:
    a first communication cable connected via a first enhanced patch cord to a first network device, said first enhanced patch cord being a first attenuating patch cord having a first patch cord attenuation greater than an attenuation of said first communication cable; and
    a second communication cable connected via a second enhanced patch cord to a second network device, said second enhanced patch cord being a second attenuating patch cord having a second patch cord attenuation greater than an attenuation of said second communication cable,
    wherein said first patch cord comprises a plurality of communication wires and said first communication cable also comprises a plurality of communication wires, said communication wires of said first patch cord having a narrower gauge than said twisted communication wires of said first communication cable, and
    wherein the attenuation of the first patch cord is greater due to the first patch cord having a narrower gauge than said first communication cable.

3. The system of claim 1 wherein said first communication cable is further connected via a third enhanced patch cord to a third network device, said third enhanced patch cord being a third attenuating patch cord having a third patch cord attenuation greater than the attenuation of the first communication cable.

4. The system of claim 3 wherein the second communication cable is further connected via a fourth enhanced patch cord to said third network device, said fourth enhanced patch cord being a fourth attenuating patch cord having a fourth patch cord attenuation greater than the attenuation of the second communication cable.

5. The system of claim 4 wherein said first and second network devices are personal computers and said third network device is an Ethernet switch.

6. A patch cord for insertion in a communication path between a network device and horizontal communication cabling and further for reducing alien crosstalk resulting from said communication path, said patch cord having a patch cord attenuation greater than an attenuation of said horizontal communication cabling,
    the patch cord comprising a plurality of twisted communication wires, said horizontal communication cabling further comprising a plurality of twisted communication wires, said twisted communication wires of said patch cord having more twists per length than said twisted communication wires of said horizontal communication cabling, and
    wherein the attenuation of the patch cord is greater due to the patch cord having more twists per length than said horizontal communication cabling.

* * * * *